(12) United States Patent
Haikawa et al.

(10) Patent No.: US 10,281,184 B2
(45) Date of Patent: May 7, 2019

(54) AIR CONDITIONER

(71) Applicant: DAIKIN INDUSTRIES, LTD., Osaka-shi, Osaka (JP)

(72) Inventors: Tomoyuki Haikawa, Kusatsu (JP); Tomoatsu Minamida, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 671 days.

(21) Appl. No.: 14/394,502

(22) PCT Filed: Apr. 4, 2013

(86) PCT No.: PCT/JP2013/060372
§ 371 (c)(1),
(2) Date: Oct. 15, 2014

(87) PCT Pub. No.: WO2013/157406
PCT Pub. Date: Oct. 24, 2013

(65) Prior Publication Data
US 2015/0068237 A1    Mar. 12, 2015

(30) Foreign Application Priority Data
Apr. 16, 2012    (JP) .................................. 2012-093123

(51) Int. Cl.
*F25B 49/02* (2006.01)
*F25B 40/02* (2006.01)
(Continued)

(52) U.S. Cl.
CPC ............ *F25B 49/022* (2013.01); *F25B 1/005* (2013.01); *F25B 40/02* (2013.01); *F25B 41/043* (2013.01);
(Continued)

(58) Field of Classification Search
CPC .... F25B 49/022; F25B 1/005; F25B 2600/02; F25B 2600/2513; F25D 17/06
See application file for complete search history.

(56) References Cited

U.S. PATENT DOCUMENTS 5,181,392 A * 1/1993 Itoh ......................... F24F 3/153
165/240
5,678,417 A    10/1997 Nigo et al.
(Continued)

FOREIGN PATENT DOCUMENTS

EP    1431677 A1    6/2004
GB    2 268 256 A   1/1994
(Continued)

OTHER PUBLICATIONS

Hongo et al., Air Conditioner, Jun. 10, 1997, JPH09152193A, Whole Document.*

(Continued)

*Primary Examiner* — Larry L Furdge
(74) *Attorney, Agent, or Firm* — Birch, Stewart, Kolasch & Birch, LLP

(57) ABSTRACT

Dehumidification cannot be performed when a load decreases. In an air conditioner of the present invention, an indoor heat exchanger includes an auxiliary heat exchanger 20 and a main heat exchanger 21 disposed leeward from the auxiliary heat exchanger 20. In an operation in a predetermined dehumidification operation mode, a liquid refrigerant supplied to the auxiliary heat exchanger 20 all evaporates midway in the auxiliary heat exchanger 20. Therefore, only an upstream partial area in the auxiliary heat exchanger 20 is an evaporation region, while an area downstream of the evaporation region in the auxiliary heat exchanger 20 is a superheat region. In the predetermined dehumidification operation mode, a compressor and an expansion valve are (Continued)

controlled so that the extent of the evaporation region of the auxiliary heat exchanger 20 varies depending on the load.

6 Claims, 5 Drawing Sheets

(51) Int. Cl.
    *F25B 1/00*     (2006.01)
    *F25B 41/04*     (2006.01)
    *F25D 17/06*     (2006.01)
    *F25B 13/00*     (2006.01)
    *F24F 1/0059*     (2019.01)
    *F24F 140/50*     (2018.01)
    *F24F 11/65*     (2018.01)

(52) U.S. Cl.
    CPC ............ *F25D 17/06* (2013.01); *F24F 1/0059* (2013.01); *F24F 11/65* (2018.01); *F24F 2140/50* (2018.01); *F25B 13/00* (2013.01); *F25B 2313/0234* (2013.01); *F25B 2313/0314* (2013.01); *F25B 2313/0315* (2013.01); *F25B 2600/02* (2013.01); *F25B 2600/2513* (2013.01); *F25B 2700/2104* (2013.01)

(56) References Cited

U.S. PATENT DOCUMENTS

| | | |
|---|---|---|
| 2006/0168998 A1 | 8/2006 | Chin et al. |
| 2010/0000243 A1* | 1/2010 | Morimoto ............... F24F 1/022 62/176.6 |

FOREIGN PATENT DOCUMENTS

| | | | |
|---|---|---|---|
| JP | 9-14727 A | | 1/1997 |
| JP | H09152193 A | * | 6/1997 |
| JP | 10-325621 A | | 12/1998 |
| JP | 2000-211505 A | | 8/2000 |
| JP | 2001-82755 A | | 3/2001 |
| JP | 2001-272086 A | | 10/2001 |
| JP | 2003-214723 A | | 7/2003 |
| JP | 2005-273923 A | | 10/2005 |
| JP | 2006-177573 A | | 7/2006 |
| JP | 2010-281548 A | | 12/2010 |
| WO | WO 03/029728 A1 | | 4/2003 |

OTHER PUBLICATIONS

International Search Report, issued in PCT/JP2013/060372, dated Jul. 2, 2013.

* cited by examiner

AIR CONDITIONER

TECHNICAL FIELD

The present invention relates to an air conditioner configured to perform a dehumidification operation.

BACKGROUND ART

There has been a conventional air conditioner in which: an auxiliary heat exchanger is disposed rearward of a main heat exchanger; and a refrigerant evaporates only in the auxiliary heat exchanger to locally perform dehumidification so that dehumidification can be performed even under a low load (even when the number of revolution of a compressor is small), for example, when the difference between room temperature and a set temperature is sufficiently small and therefore the required cooling capacity is small. In this air conditioner, an evaporation region is limited to be within the auxiliary heat exchanger, and a temperature sensor is disposed downstream of the evaporation region, to make control so that the superheat degree is constant.

CITATION LIST

Patent Literature

Patent Literature 1: Japanese Unexamined Patent Publication No. 14727/1997 (Tokukaihei 09-14727)

SUMMARY OF INVENTION

Technical Problem

However, under the control to maintain the superheat degree constant, the evaporation temperature has to be lowered when the load is relatively high. But, if the evaporation temperature is too low, the heat exchanger may freeze. In addition, the decrease of the evaporation temperature leads to a decrease in efficiency of the refrigeration cycle. Further, when the load becomes extremely low to the contrary, a rise in the evaporation temperature is necessitated, causing a problem that dehumidification cannot be performed.

In view of the above, an object of the present invention is to provide an air conditioner which ensures that dehumidification is performed under a low load even when the load varies.

Solution to Problem

An air conditioner according to a first aspect of the present invention includes a refrigerant circuit in which a compressor, an outdoor heat exchanger, an expansion valve, and an indoor heat exchanger are connected to one another. In a predetermined dehumidification operation mode, the indoor heat exchanger includes: an evaporation region where a liquid refrigerant evaporates; and a superheat region downstream of the evaporation region, and the compressor and the expansion valve are controlled so that an extent of the evaporation region varies depending on a load.

In this air conditioner, the extent of the evaporation region where the liquid refrigerant evaporates varies depending on the load in the indoor heat exchanger, and therefore, the volume of the air actually passing through the evaporation region varies even when the volume of the air taken into the indoor unit is constant. With this, dehumidification is performed with a little change in the evaporation temperature even though the load is increased/decreased.

According to a second aspect of the present invention, the air conditioner in the first aspect further includes an evaporation temperature detecting means for detecting an evaporation temperature, and the compressor and the expansion valve are controlled based on the evaporation temperature.

In this air conditioner, the extent of the evaporation region of the indoor heat exchanger is properly changed depending on the load.

According to a third aspect of the present invention, in the air conditioner of the second aspect, the compressor and the expansion valve are controlled so that the evaporation temperature falls within a predetermined temperature range.

In this air conditioner, the evaporation temperature is adjusted so as to fall within the range in which dehumidification is possible.

According to a fourth aspect of the present invention, the air conditioner of any one of the first to third aspects further includes a superheat temperature detecting means for detecting a superheat temperature.

In this air conditioner, it is detected whether evaporation is completed in the indoor heat exchanger.

According to a fifth aspect of the present invention, in the air conditioner of any one of the first to fourth aspects, the indoor heat exchanger includes an auxiliary heat exchanger to which a liquid refrigerant is supplied in the predetermined dehumidification operation mode, and a main heat exchanger disposed downstream of the auxiliary heat exchanger in the predetermined dehumidification operation mode.

According to a sixth aspect of the present invention, in the air conditioner of the fifth aspect, the main heat exchanger includes a front heat exchanger disposed on a front side in the indoor unit, and a rear heat exchanger disposed on a rear side in the indoor unit; and the auxiliary heat exchanger is disposed forward of the front heat exchanger.

In this air conditioner, it is possible to enlarge the size of the auxiliary heat exchanger, and this allows an increase of the range within which the evaporation region of the auxiliary heat exchanger varies.

According to a seventh aspect of the present invention, in the air conditioner of the sixth aspect of the present invention, the number of rows of tubes functioning as the evaporation region in the auxiliary heat exchanger in the predetermined dehumidification operation mode is not less than a half of the total number of rows of tubes of the front heat exchanger.

In this air conditioner, it is possible to sufficiently increase the extent of the evaporation region, and therefore a variation in the load is addressed sufficiently. This structure is effective especially under a high load.

According to an eighth aspect of the present invention, the air conditioner of any one of the first to seventh aspects further includes: an indoor fan configured to supply air flow to the indoor heat exchanger; and a changing means for changing the number of revolution of the indoor fan.

In this air conditioner, it is possible to change the extent of the evaporation region of the auxiliary heat exchanger depending on the load by changing the volume of the air supplied to the indoor heat exchanger.

Advantageous Effects of Invention

As described above, the present invention provides the following advantageous effects.

In the first aspect of the present invention, the extent of the evaporation region where the liquid refrigerant evaporates varies depending on the load in the indoor heat exchanger, and therefore, the volume of the air actually passing through the evaporation region varies even when the volume of the air taken into the indoor unit is constant. With this, dehumidification is performed with a little change in the evaporation temperature even though the load is increased/decreased.

In the second aspect of the present invention, the extent of the evaporation region of the indoor heat exchanger is properly changed depending on the load.

In the third aspect of the present invention, the evaporation temperature is adjusted so as to fall within the range in which dehumidification is possible.

In the fourth aspect of the present invention, it is detected whether evaporation is completed in the indoor heat exchanger.

In the sixth aspect of the present invention, it is possible to enlarge the size of the auxiliary heat exchanger, and this allows an increase of the range within which the evaporation region of the auxiliary heat exchanger varies.

In the seventh aspect of the present invention, it is possible to sufficiently increase the extent of the evaporation region, and therefore a variation in the load is addressed sufficiently. This structure is effective especially under a high load.

In the eighth aspect of the present invention, it is possible to change the extent of the evaporation region of the auxiliary heat exchanger depending on the load by changing the volume of the air supplied to the indoor heat exchanger.

DESCRIPTION OF EMBODIMENTS

The following describes an air conditioner 1 of an embodiment of the present invention.

<Overall Structure of Air Conditioner 1>

Figure 1:
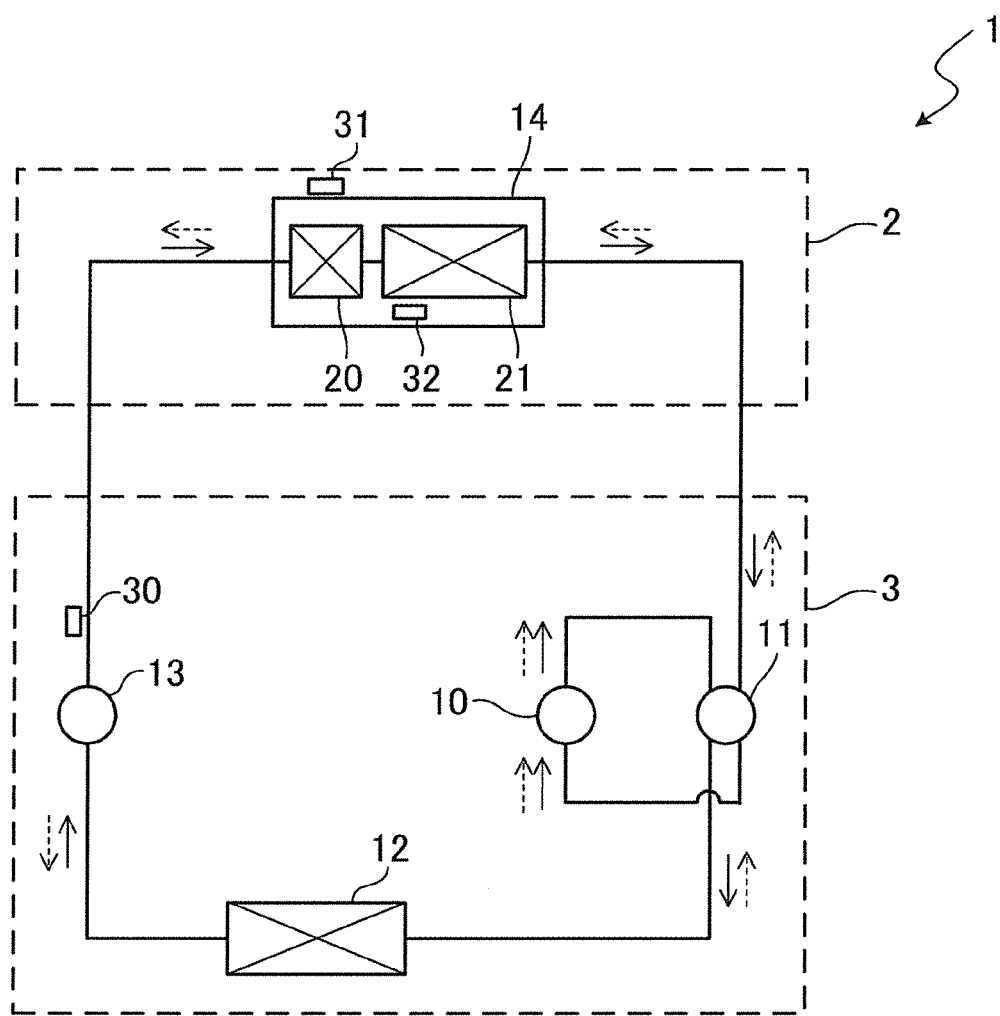
FIG. 1 is a circuit diagram showing a refrigerant circuit of an air conditioner of an embodiment of the present invention.
Figure 2:
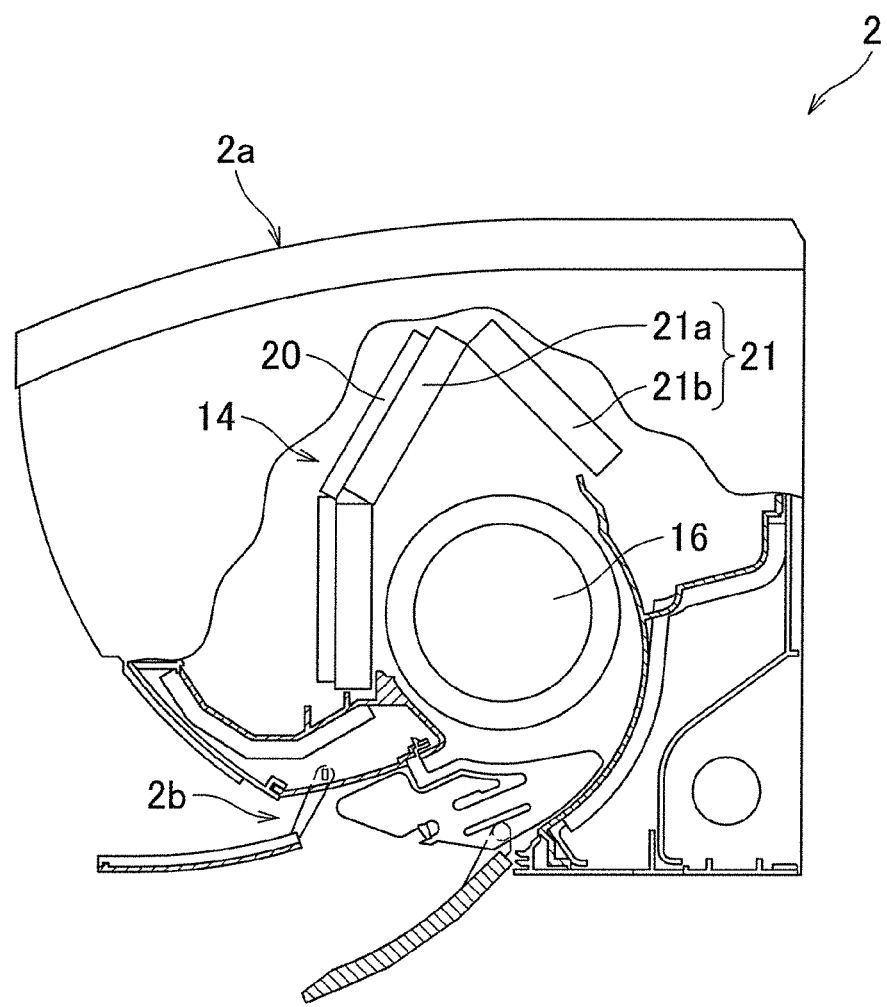
FIG. 2 is a schematic cross section of an indoor unit of the air conditioner of the embodiment of the present invention.

As shown in FIG. 1, the air conditioner 1 of this embodiment includes: an indoor unit 2 installed inside a room; and an outdoor unit 3 installed outside the room. The air conditioner 1 further includes a refrigerant circuit in which a compressor 10, a four-way valve 11, an outdoor heat exchanger 12, an expansion valve 13, and an indoor heat exchanger 14 are connected to one another. In the refrigerant circuit, the outdoor heat exchanger 12 is connected to a discharge port of the compressor 10 via the four-way valve 11, and the expansion valve 13 is connected to the outdoor heat exchanger 12. Further, one end of the indoor heat exchanger 14 is connected to the expansion valve 13, and the other end of the indoor heat exchanger 14 is connected to an intake port of the compressor 10 via the four-way valve 11. The indoor heat exchanger 14 includes an auxiliary heat exchanger 20 and a main heat exchanger 21.

In the air conditioner 1, operations in a cooling operation mode, in a predetermined dehumidification operation mode, and in a heating operation mode are possible. Using a remote controller, various operations are possible: selecting one of the operation modes to start the operation, changing the operation mode, stopping the operation, and the like. Further, using the remote controller, it is possible to adjust indoor temperature setting, and to change the air volume of the indoor unit 2 by changing the number of revolutions of an indoor fan.

As indicated with solid arrows in the figure, in the cooling operation mode and in the predetermined dehumidification operation mode, there are respectively formed a cooling cycle and a dehumidification cycle, in each of which: a refrigerant discharged from the compressor 10 flows, from the four-way valve 11, through the outdoor heat exchanger 12, the expansion valve 13, and the auxiliary heat exchanger 20, to the main heat exchanger 21 in order; and the refrigerant having passed through the main heat exchanger 21 returns back to the compressor 10 via the four-way valve 11. That is, the outdoor heat exchanger 12 functions as a condenser, and the indoor heat exchanger 14 (the auxiliary heat exchanger 20 and the main heat exchanger 21) functions as an evaporator.

Meanwhile, in the heating operation mode, the state of the four-way valve 11 is switched, to form a heating cycle in which: the refrigerant discharged from the compressor 10 flows, from the four-way valve 11, through the main heat exchanger 21, the auxiliary heat exchanger 20, and the expansion valve 13, to the outdoor heat exchanger 12 in order; and the refrigerant having passed through the outdoor heat exchanger 12 returns back to the compressor 10 via the four-way valve 11, as indicated with broken arrows in the figure. That is, the indoor heat exchanger 14 (the auxiliary heat exchanger 20 and the main heat exchanger 21) functions as the condenser, and the outdoor heat exchanger 12 functions as the evaporator.

The indoor unit 2 has, on its upper surface, an air inlet 2a through which indoor air is taken in. The indoor unit 2 further has, on a lower portion of its front surface, an air outlet 2b through which air for air conditioning comes out. Inside the indoor unit 2, an airflow path is formed from the air inlet 2a to the air outlet 2b. In the airflow path, the indoor heat exchanger 14 and a cross-flow indoor fan 16 are disposed. Therefore, as the indoor fan 16 rotates, the indoor air is taken into the indoor unit 1 through the air inlet 2a. In a front portion of the indoor unit 2, the air taken in through the air inlet 2a flows through the auxiliary heat exchanger 20 and the main heat exchanger 21 toward the indoor fan 16. Meanwhile, in a rear portion of the indoor unit 2, the air taken in through the air inlet 2a flows through the main heat exchanger 21 toward the indoor fan 16.

As described above, the indoor heat exchanger 14 includes: the auxiliary heat exchanger 20; and the main heat exchanger 21 located downstream of the auxiliary heat exchanger 20 in an operation in the cooling operation mode or in the predetermined dehumidification operation mode. The main heat exchanger 21 includes: a front heat exchanger 21a disposed on a front side of the indoor unit 2; and a rear heat exchanger 21b disposed on a rear side of the indoor unit 2. The heat exchangers 21a and 21b are arranged in a shape of a counter-V around the indoor fan 16. Further, the auxiliary heat exchanger 20 is disposed forward of the front heat exchanger 21a. Each of the auxiliary heat exchanger 20 and the main heat exchanger 21 (the front heat exchanger 21a and the rear heat exchanger 21b) includes heat exchanger pipes and a plurality of fins.

Figure 3:
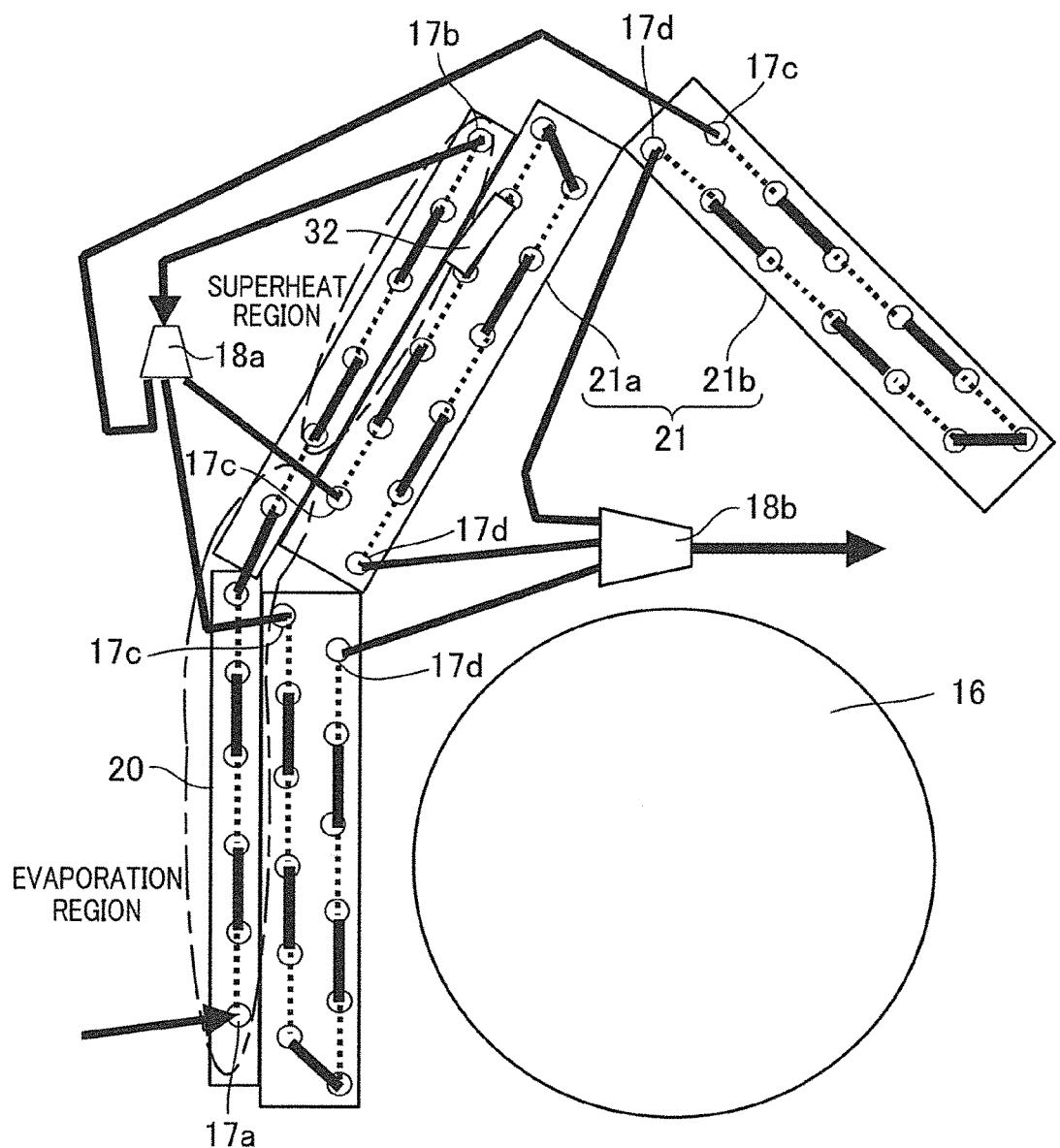
FIG. 3 is a diagram illustrating the structure of an indoor heat exchanger.

In the cooling operation mode and in the predetermined dehumidification operation mode, a liquid refrigerant is supplied through a liquid inlet 17a provided in the vicinity of a lower end of the auxiliary heat exchanger 20, and the thus supplied liquid refrigerant flows toward an upper end of the auxiliary heat exchanger 20, as shown in FIG. 3. Then, the refrigerant is discharged through an outlet 17b provided in the vicinity of the upper end of the auxiliary heat exchanger 20, and then flows to a branching section 18a. The refrigerant is divided at the branching section 18a into branches, which are respectively supplied, via three inlets 17c of the main heat exchanger 21, to a lower portion and an upper portion of the front heat exchanger 21a and to the rear heat exchanger 21b. Then, the branched refrigerant is discharged through outlets 17d, to merge together at a merging section 18b. In the heating operation mode, the refrigerant flows in a reverse direction of the above direction.

When the air conditioner 1 operates in the predetermined dehumidification operation mode, the liquid refrigerant supplied through the liquid inlet 17a of the auxiliary heat exchanger 20 all evaporates midway in the auxiliary heat exchanger 20, i.e., before reaching the outlet. Therefore, only a partial area in the vicinity of the liquid inlet 17a of the auxiliary heat exchanger 20 is an evaporation region where the liquid refrigerant evaporates. Accordingly, in the operation in the predetermined dehumidification operation mode, only the upstream partial area in the auxiliary heat exchanger 20 is the evaporation region, while (i) the area downstream of the evaporation region in the auxiliary heat exchanger 20 and (ii) the main heat exchanger 21 each functions as a superheat region, in the indoor heat exchanger 14.

Further, the refrigerant having flowed through the superheat region in the vicinity of the upper end of the auxiliary heat exchanger 20 flows through the lower portion of the front heat exchanger 21a disposed leeward from a lower portion of the auxiliary heat exchanger 20. Therefore, among the air taken in through the air inlet 2a, air having been cooled in the evaporation region of the auxiliary heat exchanger 20 is heated by the front heat exchanger 21a, and then blown out from the air outlet 2b. Meanwhile, among the air taken in through the air inlet 2a, air having flowed through the superheat region of the auxiliary heat exchanger 20 and through the front heat exchanger 21a, and air having flowed through the rear heat exchanger 21b are blown out from the air outlet 2b at a temperature substantially the same as an indoor temperature.

In the air conditioner 1, an evaporation temperature sensor 30 is attached to the outdoor unit 3, as shown in FIG. 1. The evaporation temperature sensor 30 is configured to detect an evaporation temperature and is disposed downstream of the expansion valve 13 in the refrigerant circuit. Further, to the indoor unit 2, there are attached: an indoor temperature sensor 31 configured to detect the indoor temperature (the temperature of the air taken in through the air inlet 2a of the indoor unit 2); and an indoor heat exchanger temperature sensor 32 configured to detect whether evaporation of the liquid refrigerant is completed in the auxiliary heat exchanger 20.

As shown in FIG. 3, the indoor heat exchanger temperature sensor 32 is disposed in the vicinity of the upper end of the auxiliary heat exchanger 20 and leeward from the auxiliary heat exchanger 20. Further, in the superheat region in the vicinity of the upper end of the auxiliary heat exchanger 20, the air taken in through the air inlet 2a is hardly cooled. Therefore, when the temperature detected by the indoor heat exchanger temperature sensor 32 is substantially the same as the indoor temperature detected by the indoor temperature sensor 31, it is indicated that evaporation is completed midway in the auxiliary heat exchanger 20, and that the area in the vicinity of the upper end of the auxiliary heat exchanger 20 is the superheat region. Furthermore, the indoor heat exchanger temperature sensor 32 is provided to a heat-transfer tube in a middle portion of the indoor heat exchanger 14. Thus, in the vicinity of the middle portion of the indoor heat exchanger 14, detected are the condensation temperature in the heating operation and the evaporation temperature in the cooling operation.

Figure 4:
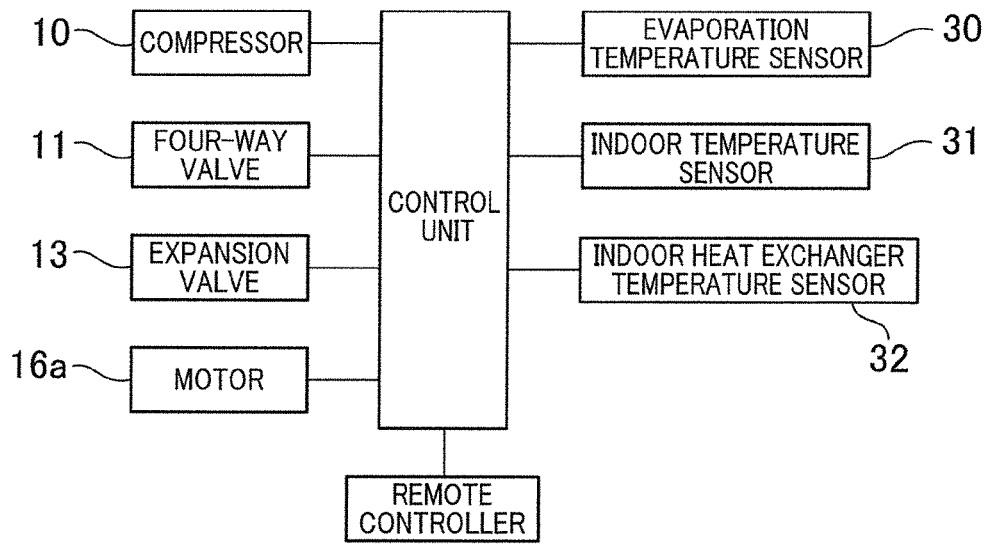
FIG. 4 is a diagram illustrating a control unit of the air conditioner of the embodiment of the present invention.

As shown in FIG. 4, the control unit of the air conditioner 1 is connected with: the compressor 10; the four-way valve 11; the expansion valve 13; a motor 16a for driving the indoor fan 16; the evaporation temperature sensor 30; the indoor temperature sensor 31; and the indoor heat exchanger temperature sensor 32. Therefore, the control unit controls the operation of the air conditioner 1 based on: a command from the remote controller (for the start of the operation, for indoor temperature setting, or the like); the evaporation temperature detected by the evaporation temperature sensor 30; the indoor temperature detected by the indoor temperature sensor 31 (the temperature of the intake air); and a heat exchanger middle temperature detected by the indoor heat exchanger temperature sensor 32.

Further, in the air conditioner 1, the auxiliary heat exchanger 20 includes the evaporation region where the liquid refrigerant evaporates and the superheat region downstream of the evaporation region in the predetermined dehumidification operation mode. The compressor 10 and the expansion valve 13 are controlled so that the extent of the evaporation region varies depending on a load. Here, "the extent varies depending on a load" means that the extent varies depending on the quantity of heat supplied to the evaporation region, and the quantity of heat is determined, for example, by the indoor temperature (the temperature of the intake air) and an indoor air volume. Further, the load corresponds to a required dehumidification capacity (required cooling capacity), and the load is determined taking into account, for example, the difference between the indoor temperature and the set temperature.

The compressor 10 is controlled based on the difference between the indoor temperature and the set temperature. When the difference between the indoor temperature and the set temperature is large, the load is high, and therefore the compressor 10 is controlled so that its frequency increases. When the difference between the indoor temperature and the set temperature is small, the load is low, and therefore the compressor 10 is controlled so that its frequency decreases.

The expansion valve 13 is controlled based on the evaporation temperature detected by the evaporation temperature sensor 30. While the frequency of the compressor 10 is controlled as described above, the expansion valve 13 is controlled so that the evaporation temperature falls within a predetermined temperature range (10 to 14 degrees Celsius) close to a target evaporation temperature (12 degrees Celsius). It is preferable that the predetermined evaporation temperature range is constant, irrespective of the frequency of the compressor 10. However, the predetermined range may be slightly changed with the change of the frequency as long as the predetermined range is substantially constant.

Thus, the compressor 10 and the expansion valve 13 are controlled depending on the load in the predetermined dehumidification operation mode, and thereby changing the extent of the evaporation region of the auxiliary heat exchanger 20, and causing the evaporation temperature to fall within the predetermined temperature range.

In the air conditioner 1, each of the auxiliary heat exchanger 20 and the front heat exchanger 21a has twelve rows of the heat-transfer tubes. When the number of rows of the tubes functioning as the evaporation region in the auxiliary heat exchanger 20 in the predetermined dehumidification operation mode is not less than a half of the total number of rows of the tubes of the front heat exchanger 21a, it is possible to sufficiently increase the extent of the evaporation region of the auxiliary heat exchanger, and therefore a variation in the load is addressed sufficiently. This structure is effective especially under a high load.

Figure 5:
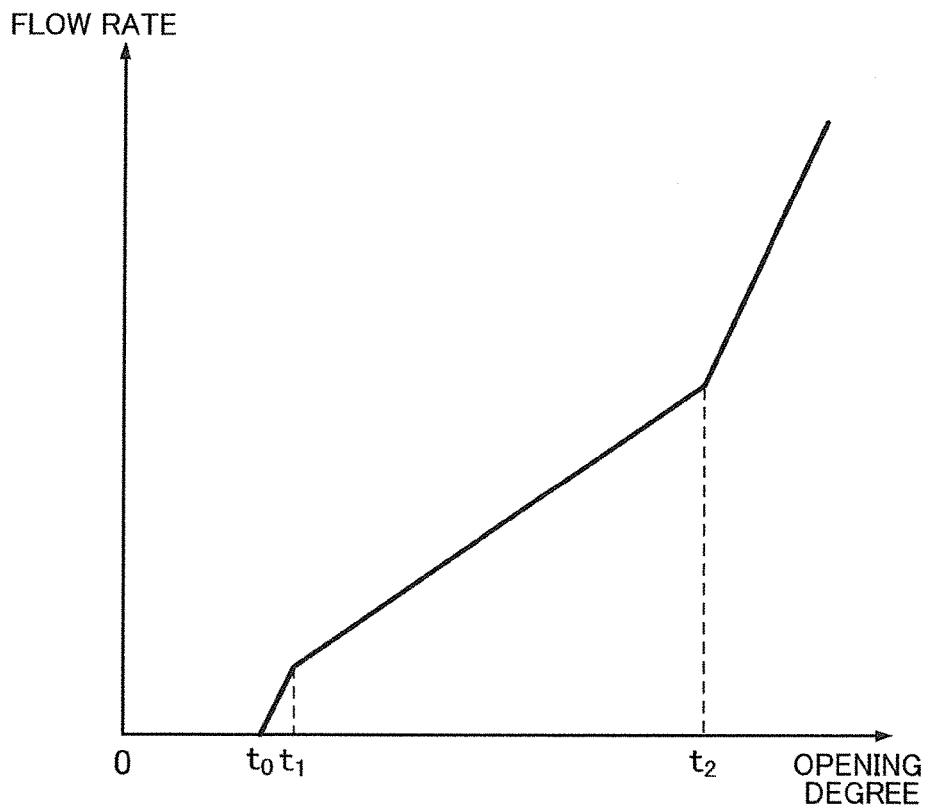
FIG. 5 is a graph showing, by way of example, how the flow rate changes as the opening degree of an expansion valve is changed.

FIG. 5 is a graph showing how the flow rate changes when the opening degree of the expansion valve 13 is changed. The opening degree of the expansion valve 13 continuously changes with the number of driving pulses input to the expansion valve 13. As the opening degree decreases, the flow rate of the refrigerant flowing through the expansion valve 13 decreases. The expansion valve 13 is fully closed when the opening degree is t0. In the range of the opening degrees t0 to t1, the flow rate increases at a first gradient as the opening degree increases. In the range of the opening degrees t1 to t2, the flow rate increases at a second gradient as the opening degree increases. Note that the first gradient is larger than the second gradient.

Figure 6:
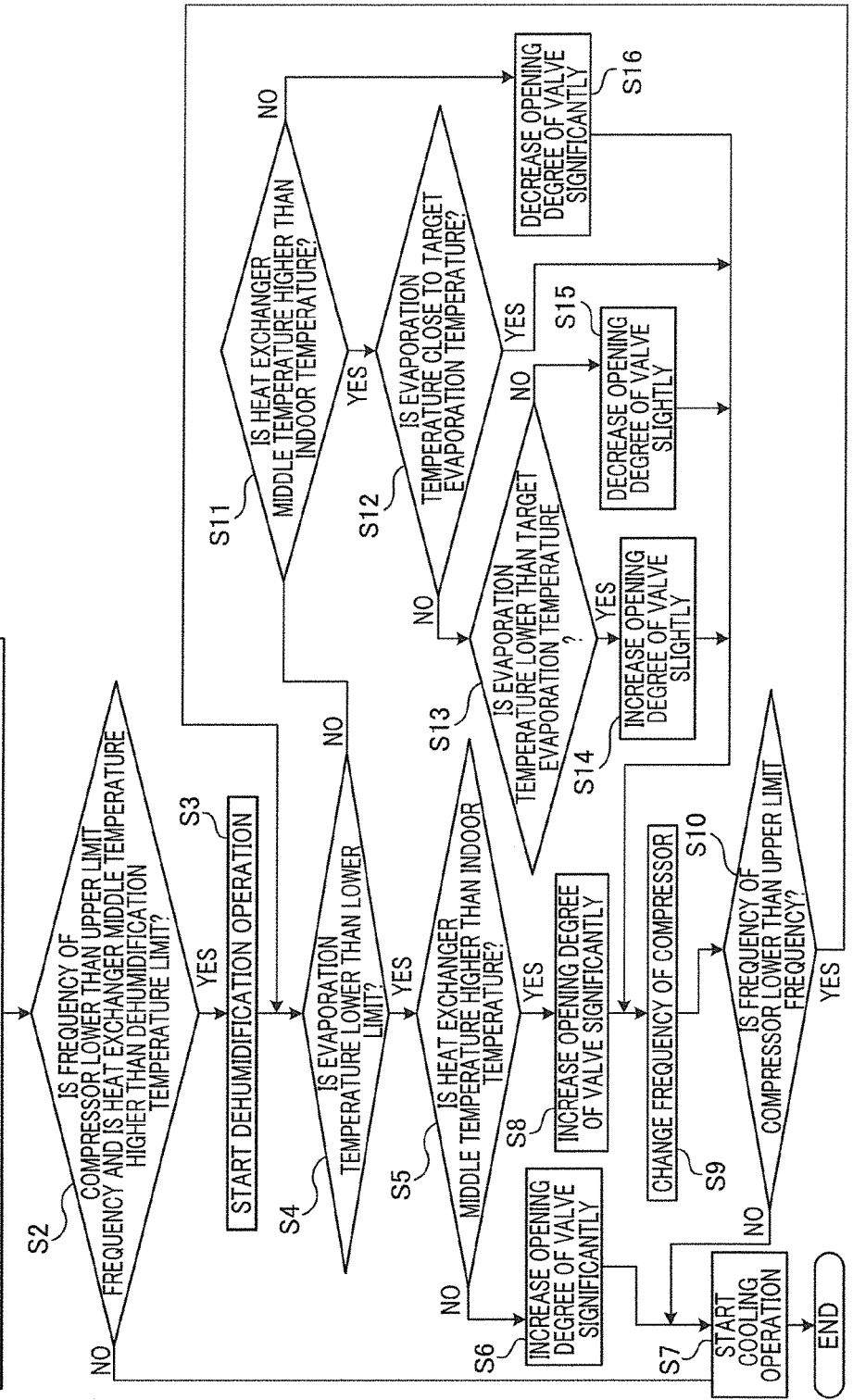
FIG. 6 is a flowchart illustrating control in an operation in a dehumidification operation mode.

With reference to FIG. 6, description will be given for the control in an operation in the predetermined dehumidification operation mode in the air conditioner 1.

First, when an operation for starting the dehumidification operation is performed on the remote controller (step S1), it is determined whether the frequency of the compressor is lower than an upper limit frequency and whether the heat exchanger middle temperature is higher than a dehumidification temperature limit, and thereby it is determined whether dehumidification is impossible in the cooling operation due to a low load (step S2). In step S2, it is determined whether dehumidification is impossible in the cooling operation due to a low load since the frequency of the compressor is lower than the upper limit frequency in the dehumidification operation mode. However, even though the frequency of the compressor is lower than the upper limit frequency, dehumidification is possible when the evaporation temperature is low. Therefore, when the evaporation temperature is lower than the dehumidification temperature limit, it is not determined that dehumidification is impossible in the cooling operation due to a low load. Accordingly, in step S2, it is determined that dehumidification is impossible in the cooling operation when the load is low and the evaporation temperature is higher than the dehumidification temperature limit.

Then, when it is determined that the frequency of the compressor is lower than the upper limit frequency and the heat exchanger middle temperature is higher than the dehumidification temperature limit (step S2: YES), dehumidification is impossible in the cooling operation due to a low load. Therefore, the opening degree of the valve is rapidly decreased, and then the dehumidification operation is started (step S3). Then, the dehumidification operation is started in which: the liquid refrigerant supplied through the liquid inlet 17a of the auxiliary heat exchanger 20 all evaporates midway in the auxiliary heat exchanger 20; and therefore only a partial area in the vicinity of the liquid inlet 17a of the auxiliary heat exchanger 20 functions as the evaporation region.

After the dehumidification operation is started, it is determined whether the evaporation temperature detected by the evaporation temperature sensor 30 is lower than a lower limit, to determine whether the evaporation temperature is too low. (step S4). When the evaporation temperature is lower than the lower limit (lower limit for preventing the closure of the expansion valve 13), it is indicated that the expansion valve 13 is almost closed. Therefore, in step S4, it is determined whether the expansion valve 13 is almost closed, to determine whether the opening degree of the valve needs to be increased.

Then, when it is determined that the evaporation temperature is lower than the lower limit (the expansion valve 13 is almost closed) (step S4: YES), it is determined whether the heat exchanger middle temperature (the temperature of the air in the vicinity of the upper end of the auxiliary heat exchanger 20 and leeward from the auxiliary heat exchanger 20) is higher than the indoor temperature, thereby to determine whether evaporation is completed in the auxiliary heat exchanger 20 (step S5). When the area in the vicinity of the upper end of the auxiliary heat exchanger 20 is the superheat region, the air taken in through the air inlet 2a is hardly cooled in the area in the vicinity of the upper end of the auxiliary heat exchanger 20, and therefore, the heat exchanger middle temperature detected by the indoor heat exchanger temperature sensor 32 is close to or higher than the indoor temperature detected by the indoor temperature sensor 31. Accordingly, in step S5, when the heat exchanger middle temperature is equal to or higher than a temperature obtained by subtracting a correction amount from the indoor temperature, it is determined that the temperature of the air in the vicinity of the upper end of the auxiliary heat exchanger 20 and leeward from the auxiliary heat exchanger 20 is higher than the indoor temperature, and it is determined that the area in the vicinity of the upper end of the auxiliary heat exchanger 20 is the superheat region, and hence evaporation is completed in the auxiliary heat exchanger 20.

When the heat exchanger middle temperature (the temperature of the air in the vicinity of the upper end of the auxiliary heat exchanger 20 and leeward from the auxiliary heat exchanger 20) is lower than the indoor temperature (step S5: NO), the opening degree of the valve is rapidly increased even though evaporation is not completed within the auxiliary heat exchanger 20 (step S6). Then, the cooling operation is started in the state where the liquid refrigerant supplied through the liquid inlet 17a of the auxiliary heat exchanger 20 flows into the main heat exchanger 21 (step S7).

On the other hand, when the heat exchanger middle temperature (the temperature of the air in the vicinity of the upper end of the auxiliary heat exchanger 20 and leeward from the auxiliary heat exchanger 20) is higher than the indoor temperature (step S5: YES), evaporation is completed within the auxiliary heat exchanger 20 and the auxiliary heat exchanger 20 has the evaporation region and the superheat region. In this state, the opening degree of the valve is significantly increased (step S8). Thereafter, the frequency of the compressor is changed so that the indoor temperature approaches the set temperature (step S9). Then, it is determined whether the frequency of the compressor is lower than the upper limit frequency (step S10). When the frequency of the compressor is equal to or higher than the upper limit frequency (step S10: NO), dehumidification is possible in the cooling operation, and therefore the cooling operation is started (step S7). When the frequency of the compressor is lower than the upper limit frequency (step S10: YES), the routine proceeds to step S4 while keeping the dehumidification operation.

When, in step S2, it is determined that the frequency of the compressor is equal to or higher than the upper limit frequency, or that the heat exchanger middle temperature is equal to or lower than the dehumidification temperature limit (step S2: NO), dehumidification is possible in the cooling operation, and therefore the cooling operation is started (step S7).

When, in step S4, the evaporation temperature detected by the evaporation temperature sensor 30 is equal to or higher than the lower limit (step S4: NO), it is determined whether the heat exchanger middle temperature (the temperature of the air in the vicinity of the upper end of the auxiliary heat exchanger 20 and leeward from the auxiliary heat exchanger 20) is higher than the indoor temperature, thereby to determine whether evaporation is completed within the auxiliary heat exchanger 20 (step S11).

When the heat exchanger middle temperature (the temperature of the air in the vicinity of the upper end of the auxiliary heat exchanger 20 and leeward from the auxiliary heat exchanger 20) is higher than the indoor temperature (step S11: YES), evaporation is completed within the auxiliary heat exchanger 20, and the auxiliary heat exchanger 20 has the evaporation region and the superheat region. Then, it is determined whether the evaporation temperature falls within the predetermined temperature range close to the target evaporation temperature (step S12). Thus, in step S12, it is determined whether the opening degree of the valve needs to be changed so that the evaporation temperature detected by the evaporation temperature sensor 30 falls within the predetermined temperature range close to the target evaporation temperature.

When, in step S12, the evaporation temperature falls within the predetermined temperature range close to the target evaporation temperature (step S12: YES), there is no need to change the opening degree of the valve, and therefore the routine proceeds to step S9.

On the other hand, when the evaporation temperature does not fall within the predetermined temperature range close to the target evaporation temperature (step S12: NO), it is determined whether the evaporation temperature is lower than the target evaporation temperature (step S13). When the evaporation temperature is lower than the target evaporation temperature (step S13: YES), the opening degree of the valve is slightly increased so that the evaporation temperature becomes closer to the target evaporation temperature (step S14). When the evaporation temperature is higher than the target evaporation temperature (step S13: NO), the opening degree of the valve is slightly decreased so that the evaporation temperature becomes closer to the target evaporation temperature (step S15). Then, the routine proceeds to step S9.

When, in step S11, the heat exchanger middle temperature (the temperature of the air in the vicinity of the upper end of the auxiliary heat exchanger 20 and leeward from the auxiliary heat exchanger 20) is equal to or lower than the indoor temperature (step S11: NO), evaporation is not completed within the auxiliary heat exchanger 20, and therefore the opening degree of the valve is significantly closed (step S16). Then, the routine proceeds to step S9.

Thus, in the air conditioner 1, control is made so that the extent of the evaporation region of the auxiliary heat exchanger 20 varies in the predetermined dehumidification operation mode. For example, when the load increases in the predetermined dehumidification operation mode on the condition that the extent of the evaporation region of the auxiliary heat exchanger 20 is of a predetermined size, the frequency of the compressor 10 is increased and the opening degree of the expansion valve 13 is changed so as to increase. As a result, the extent of the evaporation region of the auxiliary heat exchanger 20 becomes larger than that of the predetermined size, and this increases the volume of the air actually passing through the evaporation region even when the volume of the air taken into the indoor unit 2 is constant.

Meanwhile, when the load becomes lower in the predetermined dehumidification operation mode on the condition that the extent of the evaporation region of the auxiliary heat exchanger 20 is of the predetermined size, the frequency of the compressor 10 is decreased and the opening degree of the expansion valve 13 is changed so as to decrease. Therefore, the extent of the evaporation region of the auxiliary heat exchanger 20 becomes smaller than that of the predetermined size, and this decreases the volume of the air actually passing through the evaporation region even when the volume of the air taken into the indoor unit 2 is constant.

<Characteristics of the Air Conditioner of this Embodiment>

In the air conditioner 1 of this embodiment, the extent of the evaporation region where the liquid refrigerant evaporates varies in the auxiliary heat exchanger 20, and therefore the volume of the air actually passing through the evaporation region varies even when the volume of the air taken into the indoor unit 2 is constant. This makes it possible to continue dehumidification under a wide range of loads, without excessively decreasing the evaporation temperature in order to complete evaporation within the auxiliary heat exchanger 20 when the load is high and thereby worsening the COP (coefficient of performance). Further, there is no need to extremely decrease the evaporation temperature, and therefore freeze is prevented, which eliminates the necessity of defrost operation. Moreover, dehumidification is possible even when the volume of the air is increased, and therefore, dehumidification is performed while uniformly cooling the entire room even under a low load, to remove uncomfortable feeling of humid and hot air.

In addition, in the air conditioner 1 of this embodiment, the compressor 10 and the expansion valve 13 are controlled so that the evaporation temperature falls within the predetermined temperature range. Therefore, the extent of the evaporation region of the auxiliary heat exchanger 20 is properly changed depending on the load, and the evaporation temperature is adjusted so as to fall within the range in which dehumidification is possible.

Further, in the air conditioner 1 of this embodiment, the temperature of the air leeward from the superheat region of the auxiliary heat exchanger 20 is detected by the indoor heat exchanger temperature sensor 32, and therefore it is detected whether evaporation is completed in the auxiliary heat exchanger 20.

Furthermore, in the air conditioner 1 of this embodiment, the main heat exchanger 21 includes the front heat exchanger 21a disposed on the front side in the indoor unit 2, and the rear heat exchanger 21b disposed on the rear side in the indoor unit 2, and the auxiliary heat exchanger 20 is disposed forward of the front heat exchanger 21a. This makes it possible to enlarge the size of the auxiliary heat exchanger 20, and this allows the increase of the range within which the evaporation region of the auxiliary heat exchanger 20 varies.

Further, in the air conditioner 1 of this embodiment, the number of revolution of the indoor fan 16 is changeable.

Therefore, it is possible to change the extent of the evaporation region of the auxiliary heat exchanger 20 depending on the load by changing the volume of the air supplied to the indoor heat exchanger 14.

While the embodiment of the present invention has been described based on the figures, the scope of the invention is not limited to the above-described embodiment. The scope of the present invention is defined by the appended claims rather than the foregoing description of the embodiment, and various changes and modifications can be made herein without departing from the scope of the invention.

In the above-described embodiment, the auxiliary heat exchanger and the main heat exchanger may be formed into a single unit. In this case, the indoor heat exchanger is formed as a single unit, and a first portion corresponding to the auxiliary heat exchanger is provided on the most windward side of the indoor heat exchanger, and a second portion corresponding to the main heat exchanger is provided leeward from the first portion.

Further, the above-described embodiment deals with the air conditioner configured to operate in the cooling operation mode, in the predetermined dehumidification operation mode, and in the heating operation mode. However, the present invention may be applied to an air conditioner configured to conduct a dehumidification operation in a dehumidification operation mode other than the predetermined dehumidification operation mode, in addition to the dehumidification operation in the predetermined dehumidification operation mode.

INDUSTRIAL APPLICABILITY

The present invention ensures that dehumidification is performed under a low load even when the load varies.

REFERENCE SIGNS LIST 1 air conditioner
2 indoor unit
3 outdoor unit
10 compressor
12 outdoor heat exchanger
13 expansion valve
14 indoor heat exchanger
16 indoor fan
20 auxiliary heat exchanger
21 main heat exchanger

The invention claimed is:

1. An air conditioner, comprising
a refrigerant circuit in which a compressor, an outdoor heat exchanger, an expansion valve, and an indoor heat exchanger are connected to one another; and
an evaporation temperature sensor positioned in the refrigerant circuit so as to detect an evaporation temperature, wherein
in a predetermined dehumidification operation mode, the indoor heat exchanger is arranged so that a liquid refrigerant supplied to a liquid inlet of the indoor heat exchanger flows toward an upper end of the indoor heat exchanger and includes: an evaporation region where the liquid refrigerant evaporates; and a superheat region downstream of the evaporation region, and the compressor and the expansion valve are controlled so that the evaporation temperature detected by the evaporation temperature sensor falls within a predetermined temperature range,
the indoor heat exchanger includes a first portion and a second portion provided leeward from the first portion, and the second portion is provided downstream of the first portion in a direction in which the refrigerant flows in the dehumidification operation mode,
the liquid inlet of the indoor heat exchanger is at a lower part of the first portion,
when a load increases, a frequency of the compressor is increased and an opening degree of the expansion valve increases, so that an extent of the evaporation region becomes larger within a part where the liquid refrigerant supplied to the liquid inlet flows toward the upper end of the first portion, and
when the load becomes lower, the frequency of the compressor is decreased and the opening degree of the expansion valve decreases, so that the extent of the evaporation region becomes smaller within the part where the liquid refrigerant supplied to the liquid inlet flows toward the upper end of the first portion.

2. The air conditioner according to claim 1, further comprising:
an indoor temperature sensor provided in the air conditioner and configured to detect an indoor temperature; and
a heat exchanger middle temperature sensor provided leeward from the part where the liquid refrigerant supplied to the liquid inlet flows toward the upper end of the first portion and configured to detect a temperature of air passing through the part,
the opening degree of the expansion valve being controlled based on a comparison between the indoor temperature detected by the indoor temperature sensor and the temperature detected by the heat exchanger middle temperature sensor.

3. The air conditioner according to claim 1, wherein
the indoor heat exchanger includes: an auxiliary heat exchanger to which a liquid refrigerant is supplied in the predetermined dehumidification operation mode; and a main heat exchanger disposed downstream of the auxiliary heat exchanger in the predetermined dehumidification operation mode,
the auxiliary heat exchanger is constituted by the first portion, and
the main heat exchanger includes the second portion and a third portion which is disposed at a position not leeward from the first portion.

4. The air conditioner according to claim 3, wherein:
the main heat exchanger includes a front heat exchanger disposed on a front side in the indoor unit, and a rear heat exchanger disposed on a rear side in the indoor unit; and
the front heat exchanger is constituted by the second portion, and the rear heat exchanger is constituted by the third portion.

5. The air conditioner according to claim 4, wherein
the number of rows of tubes functioning as the evaporation region in the auxiliary heat exchanger in the predetermined dehumidification operation mode is not less than a half of the total number of rows of tubes of the front heat exchanger.

6. The air conditioner according to claim 1, further comprising:
an indoor fan configured to supply air flow to the indoor heat exchanger; and a changing unit configured to change the number of revolution of the indoor fan.

\* \* \* \* \*